Figure 1:
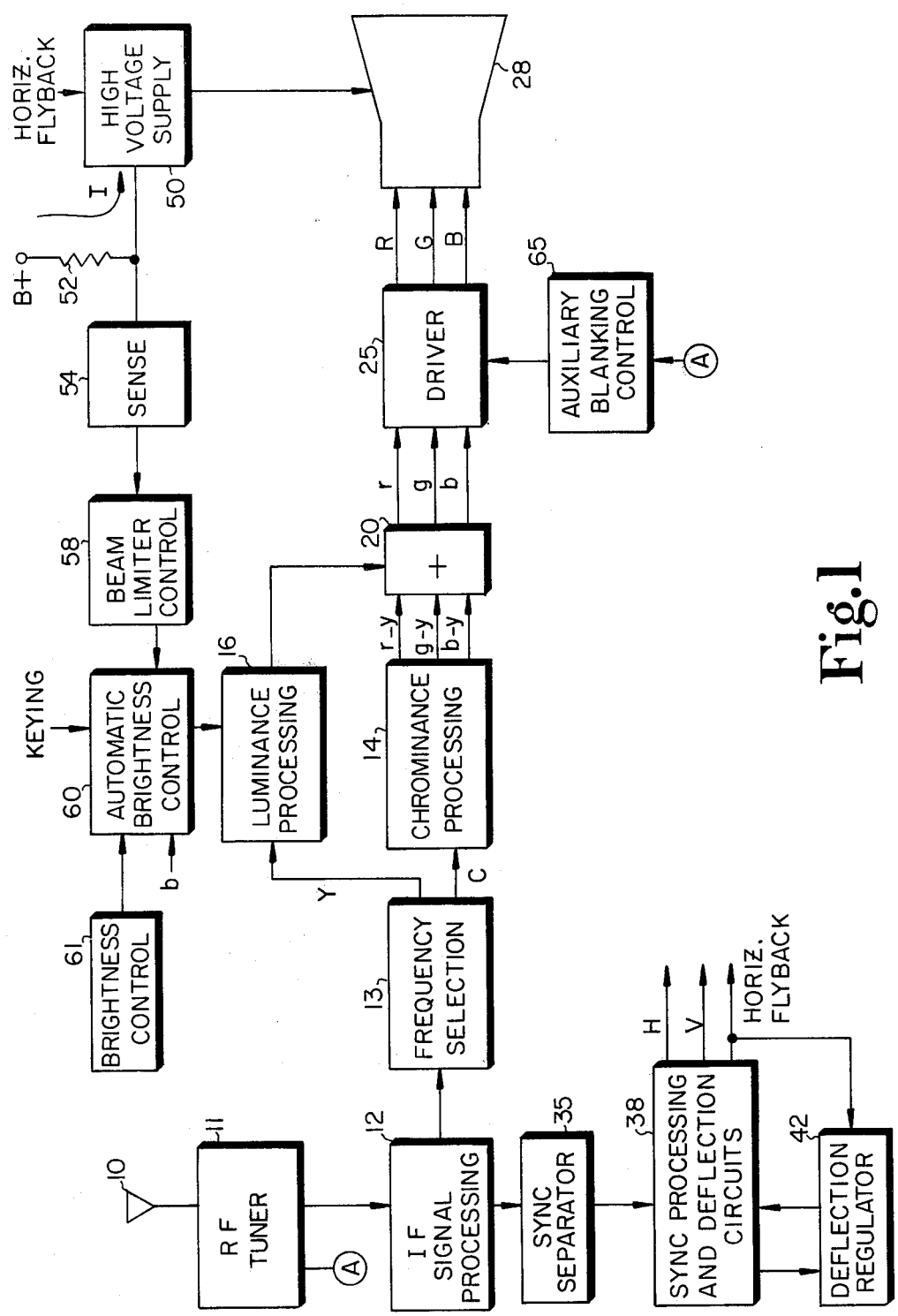

United States Patent [19]

Naimpally

[11] 4,330,792
[45] May 18, 1982

[54] VIDEO BLANKING CIRCUIT WITH CONTROLLED RATE OF UNBLANKING

[75] Inventor: Saiprasad V. Naimpally, Indianapolis, Ind.

[73] Assignee: RCA Corporation, New York, N.Y.

[21] Appl. No.: 210,839

[22] Filed: Nov. 26, 1980

[51] Int. Cl.³ ............................................ H04N 9/535
[52] U.S. Cl. .................................... 358/33; 358/165; 358/191.1; 358/193.1
[58] Field of Search ...................... 358/33, 165, 191.1, 358/193.1

[56] References Cited

U.S. PATENT DOCUMENTS

| | | |
|---|---|---|
| 3,131,255 | 4/1964 | Di Nardo . |
| 3,573,365 | 4/1971 | Anderson ............................. 358/165 |
| 3,673,318 | 6/1972 | Olsen et al. . |
| 3,707,597 | 12/1972 | Lunn . |
| 4,047,226 | 9/1977 | Hedges ............................. 358/193.1 |

OTHER PUBLICATIONS
RCA TV Service Data Chassis CTC 101, RCA Consumer Electronics, File 1979 C-7, 1979.

Primary Examiner—Richard Murray
Attorney, Agent, or Firm—Eugene M. Whitacre; William H. Meagher; Ronald H. Kurdyla

[57] ABSTRACT

A circuit is disclosed for automatically blanking the kinescope of a color television receiver during channel changing intervals. The receiver also includes an automatic kinescope beam current limiter, plural kinescope driver stages, and a source of reference bias voltage to which video signals amplified by the kinescope driver stages are normally referenced, coupled in common to the plural kinescope driver stages. During channel changing intervals, the blanking circuit modifies the reference voltage with a given blanking response time so that the driver stages and kinescope are blanked. The blanking circuit exhibits an unblanking response time, slower than the blanking response time, for permitting the reference bias voltage to gradually return to a normal level after the channel change interval ends, at which time the driver stages and kinescope are unblanked and operate normally.

6 Claims, 2 Drawing Figures

VIDEO BLANKING CIRCUIT WITH CONTROLLED RATE OF UNBLANKING

This invention concerns a circuit for blanking video signals processed by a television receiver when the receiver is being tuned from channel to channel, and for unblanking the video signals with a given unblanking response time after the receiver is tuned. In particular, the invention relates to such a circuit arranged to augment the control of kinescope beam current normally provided by an automatic beam current limiter circuit of the receiver.

Television receivers often include apparatus for automatically limiting excessive beam currents conducted by an image reproducing kinescope of the receiver. The beam current limiter is typically arranged so as to sense when potentially damaging levels of kinescope beam current above a threshold level are present. A control voltage developed in response to the sensed current is utilized, for example, to control the television signal with a sense to limit the beam currents to a safe level. The beam current limiter typically does not react instantaneously to excessive beam current levels, due to time constant effects which cause the beam limiter operation to exhibit a slight delay.

Many television receivers also include provision for blanking the kinescope display during intervals when the receiver is being tuned from channel to channel. Such channel change blanking is considered desirable since it serves to eliminate visual interference which would normally occur during tuning of the receiver. Such interference results from transient signals that are received as the receiver is tuned from one channel to the next, causing disturbing flashes, streaks, and other forms of transient interference to be displayed by the kinescope.

The video signal level appearing after a given channel is tuned may be sufficient to cause the kinescope to conduct very high levels of beam current, several times greater than the threshold current level above which the automatic beam current limiter operates. The likelihood of such high level signal conditions occurring is increased by the often unpredictable behavior of the intermediate frequency (IF) signal processing stages of the receiver during channel change intervals. Under certain conditions the channel change operation can cause the peak detected white level output of the IF stages to be abnormally high and capable of causing abnormally high and unsafe levels of kinescope beam current, in response to white-going noise transients, for example when the response time of the automatic beam current limiter is insufficient to limit such abnormally high beam currents quickly, the kinescope and associated circuits would be subjected to potentially destructive electrical stresses.

In many television receivers the high operating voltages for the kinescope are derived from a high voltage supply (e.g., a voltage tripler) which responds to horizontal flyback pulses generated locally by deflection circuits of the receiver during horizontal image retrace intervals. When such television receivers also employ a deflection voltage regulator including a switching circuit responsive to the flyback pulses, the operation of the deflection regulator, and thereby the operation of the deflection circuits, can be disturbed in the presence of excessively high, uncontrolled beam currents as derived from the high voltage supply. This disturbed operation can result in a badly distorted display including random streaks across the display, among other effects.

In accordance with the present invention there is disclosed herein a channel change blanking network arranged to provide a measure of control over kinescope beam currents developed immediately after the channel change blanking interval ends. In addition, the blanking network is arranged so as to facilitate control over beam currents developed in response to both luminance and chrominance components of a video signal processed by a color television receiver.

Channel change blanking apparatus according to the present invention is included in a color television receiver including a video signal processing channel for providing plural color image representative video signals, a kinescope for providing a picture display in response to the color signals, plural video output stages for respectively supplying the plural color signals to the kinescope, and a network for automatically limiting excessive beam currents conducted by the kinescope. The receiver also includes an input frequency selective tuning network, a switch network, and a source of reference bias potential coupled in common to the plural video output stages and to which video signals processed by the video output stages are normally referenced. The tuning network includes an adjustable channel selector operated during channel changing intervals for selectably tuning the receiver. The switch network is coupled to a source of potential, and exhibits a first switching state during the channel changing intervals and a second switching state at other times. In addition, a blanking network is coupled to the reference bias source and to the switch network. The blanking network exhibits a blanking response time for producing a modified reference bias potential during channel change intervals so that the video output stages and thereby the kinescope are blanked during channel change intervals. The blanking network also exhibits an unblanking response time slower than the blanking response time, for permitting the modified reference bias voltage to gradually return to normal after the channel change interval ends.

Figure 2:
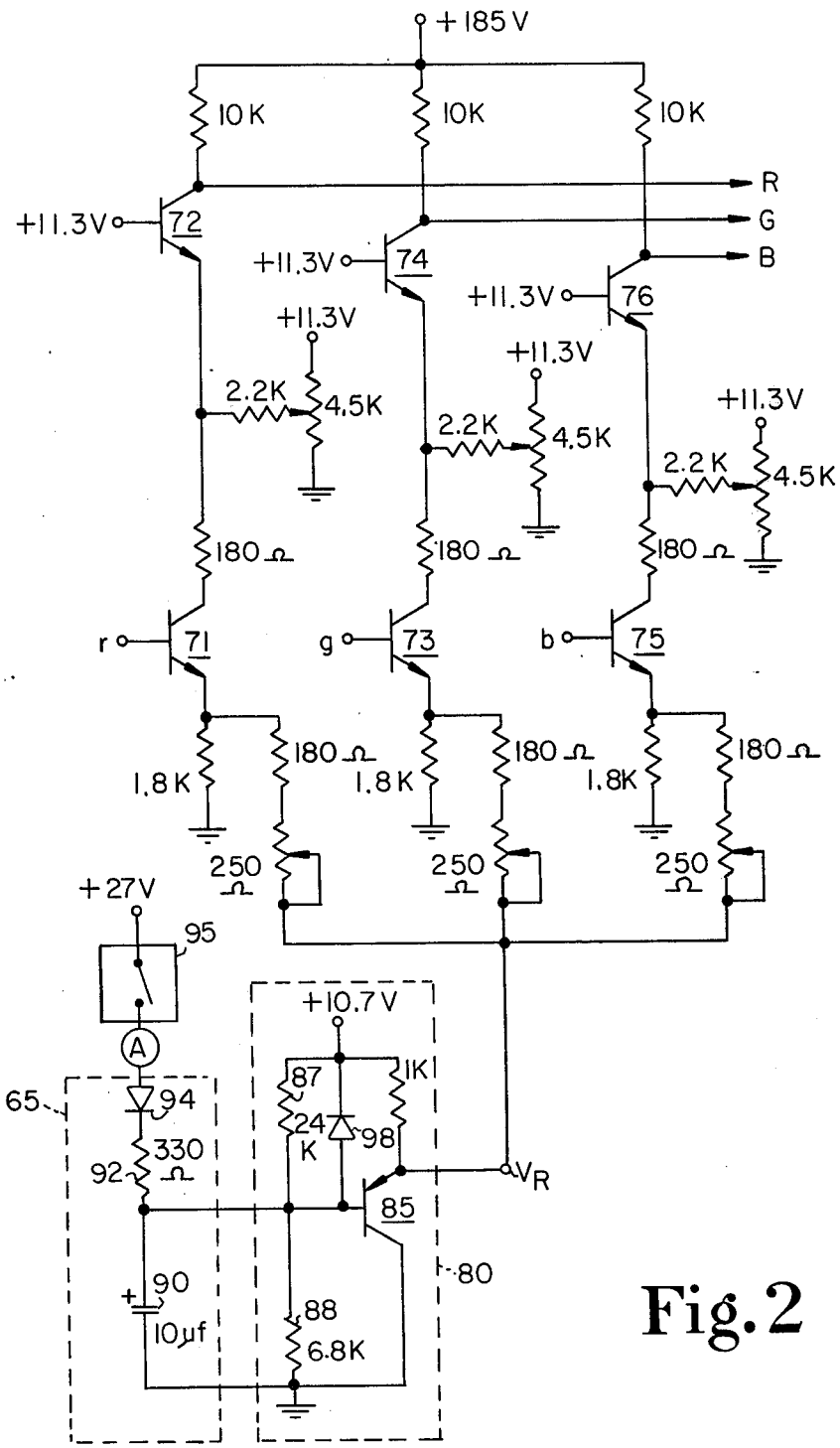

In the drawing:

FIG. 1 illustrates a block diagram of a portion of a color television receiver including a blanking network according to the present invention; and FIG. 2 shows a circuit diagram of a portion of the system of FIG. 1, including details of the blanking network.

In the system of FIG. 1, broadcast composite color television signals are received by an antenna 10 and supplied to a radio frequency (RF) tuner stage 11. Tuner 11 includes a frequency selective channel selector mechanism, an automatic fine tuning (AFT) control circuit, and RF and mixer stages for providing an intermediate frequency (IF) output signal. Associated with the channel selector mechanism is a switch network coupled to an output terminal A of tuner 11 and operative when the receiver is being tuned from channel to channel, at which time the AFT network is disabled.

The IF signals from tuner unit 11 are supplied to an IF signal processor 12 including IF amplifier and video detector stages as well as automatic gain control (AGC) circuits. One signal output of IF unit 12 supplies a detected video signal to a frequency selection bandpass filter 13 (e.g., including a comb filter) for providing separated luminance (Y) and chrominance (C) components of the composite color television signal.

Another detected video signal output of IF processor 12 is coupled to a sync separator 35 for deriving the horizontal line synchronizing (sync) component of the television signal. The derived sync component is supplied from an output of separator 35 to sync processing and deflection circuits 38. Circuits 38 (e.g., including synchronized horizontal and vertical oscillators) provide horizontal and vertical deflection signals H and V for application to deflection control circuits of a color kinescope 28, and horizontal flyback pulses during horizontal line retrace intervals. Operatively associated with deflection circuits 38 is a horizontal deflection voltage regulator 42 including a switching network (e.g., an SCR switching network) timed to operate in response to horizontal flyback pulses received from deflection circuits 38.

The separated chrominance component (C) from unit 13 is processed by a unit 14 for providing r-y, g-y and b-y color difference signals. These signals are combined in a matrix 20 with processed luminance signals from a luminance processor 16 to provide low level, color image representative signals r, g and b. These color signals are amplified individually within a kinescope driver stage 25 to provide high level output color signals R, B and G, which are coupled to respective intensity control electrodes (e.g., cathodes) of kinescope 28.

High operating voltage for kinescope 28 is provided from a high voltage supply 50 (e.g., a voltage tripler). One input of supply 50 is supplied with horizontal flyback pulses, and another input of supply 50 is coupled to a source of operating potential (B+) via a resistor 52. Current (I) supplied to supply 50 via resistor 52 is representative of the beam current demand of kinescope 28.

Excessively high average beam currents above a threshold level are sensed by an average responding sensing unit 54 (e.g., including a filter capacitor) coupled to resistor 52. A signal developed by sensing unit 54 in accordance with the level of excessive beam currents is applied to a beam current limiter control network 58, which develops a suitable output control voltage proportional to the level of excessive beam current.

A keyed automatic brightness control network 60 develops an output signal suitable for controlling the brightness representative DC level of luminance signals processed by network 16 in response to a reference voltage derived from a viewer adjustable brightness control 61 (e.g., a potentiometer), the output control voltage from beam limiter control network 58, and the level of the b color signal from matrix 20 during the "back porch" interval of horizontal blanking intervals. For purposes of normal brightness control, unit 60 is keyed during the "back porch" interval of horizontal blanking intervals to compare the reference voltage from brightness network 61 with the blanking level then associated with the b color signal. The output signal from network 60 adjusts the DC level of the luminance signal in accordance with the setting of brightness control 61 via a closed control loop including luminance processor 16, matrix 20, and brightness control network 60. In the beam current limiting mode, control network 60 compares the blanking level of signal b with the control voltage from unit 58. The output signal then developed by network 60 serves to modify the DC level of the luminance signal from processor 16 in a direction to limit excessive kinescope beam current conduction via a second control loop. The arrangement including automatic brightness control 60 can be of the type disclosed in U.S. Pat. No. 4,209,808 and in U.S. Pat. No. 4,197,557 for example. The described automatic beam current limiter including control unit 58 can be of the type disclosed in a copending U.S. patent application Ser. No. 103,445 of L. A. Harwood, et al., titled "Automatic Kinescope Beam Current Limiter With Sequential Control Modes."

The response time of the average beam current limiter is dictated by factors including the time constant associated with the circuits in the beam current limiter control loop. In this example, the automatic beam current limiter operation exhibits a delay (approximately 0.1 seconds) between the time excessive beam currents first appear, and the time when beam limiter operation is initiated. The average beam current limiter in this case typically becomes effective for steady state beam current limiting within about one-half second after excessive beam currents first appear.

An auxiliary blanking control network 65 is coupled to kinescope driver stage 25 and to terminal A of tuner 11, and serves to blank the kinescope display when the receiver is being tuned from channel to channel. Additional details of blanking network 65 and driver 25 are shown in FIG. 2.

Referring to FIG. 2, kinescope driver stage 25 is shown as comprising red, green and blue signal amplifiers respectively including transistor pairs 71 and 72, 73 and 74, and 75 and 76, each pair being arranged in cascode amplifier configuration. Low level r, g and b signals are applied individually to base inputs of transistors 71, 73 and 75 for developing high level R, G, B signals at collector outputs of transistors 72, 74 and 76, respectively.

Driver stage 25 also includes a bias network 80 associated in common with each of the red, green and blue signal amplifiers. Network 80 includes a PNP transistor 85 biased by means of a network including resistors 87 and 88 to provide a bias reference voltage $V_R$ (approximately +3.2 volts) at the emitter output of transistor 85. Reference voltage $V_R$ is coupled in common to the emitter circuits of transistors 71, 73 and 75, and represents a reference potential to which the video signals amplified by the driver stage are referenced for the purpose of establishing a desired picture black level reference. Specifically, the value of voltage $V_R$ is such that substantially no signal currents flow in the color signal amplifiers, and the kinescope is biased at a threshold conduction point, when the input color signals exhibit a black level picture condition. This condition occurs, for example, when a viewer adjustable brightness control of the receiver (e.g., included in network 61 of FIG. 1) is at mid-range setting.

Blanking control network 65 (FIG. 1) is shown in FIG. 2 as comprising a capacitor 90, resistor 92 and diode 94 arranged in series between terminal A at the output of tuner 11 (FIG. 1) and a point of reference potential (ground). A voltage developed on capacitor 90 is applied to the base electrode of transistor 85. A switch 95 coupled to a source of DC potential (+27 v.) is located in tuner unit 11.

Switch 95 is in an open or nonconductive position (as shown) when the receiver is tuned to a television channel. At such time a stable, quiescent voltage of approximately +2.5 volts appear on capacitor 90 and bias network 80 is permitted to develop reference voltage $V_R$ (approximately +3.2 volts). Switch 95 is rendered conductive (closed) during channel change blanking intervals when the receiver is being tuned from one channel to the next (i.e., between channels). In the case of a mechanical channel selector mechanism, for example, switch 95 opens and closes in response to the operation of a cam associated with the channel selector.

During each channel change blanking interval, capacitor 90 charges rapidly to a voltage above the quiescent voltage, toward the +27 volt level of the supply connected to switch 95. The rate at which capacitor 90 charges (i.e., the charging time constant) is determined by the level of the +27 volt supply, the (negligible) impedances of switch 95 when closed and terminal A, the impedance presented by diode 94 and resistor 92, and the value of capacitor 90. In this example the charging time constant of capacitor 90 is approximately 3.3 milliseconds.

A normally nonconductive clamping diode 98 conducts to clamp the base voltage of transistor 85 to approximately +11.2 volts when the voltage on capacitor 90 reaches or attempts to exceed this level. The clamping action of diode 98 prevents the base voltage of transistor 85 and the voltage on capacitor 90 from exceeding +11.2 volts, at which time transistor 85 is rendered nonconductive (reverse biased). The emitter potential of transistor 85 then rises to a voltage $V_R'$ which is more positive (on the order of +5 volts) than normal emitter reference voltage $V_R$, and which is primarily determined by the impedance presented to the emitter of transistor 85 in conjunction with the level of the D.C. operating supply voltage (+10.7 volts) applied to the emitter circuit of transistor 85. The more positive reference voltage $V_R'$ causes signal amplifier transistors 71, 73 and 75 to be cut-off or blanked, thereby also blanking the kinescope display.

At the end of the channel change blanking interval, switch 95 is rendered nonconductive and capacitor 90 begins to discharge at a predetermined rate that is slower than the charging rate of capacitor 90 via resistor 92. The discharge time constant of capacitor 90 is on the order of fifty milliseconds, and is determined by the value of capacitor 90 and the value of the parallel combination of resistors 87 and 88. Diode 98 is rendered nonconductive when the voltage on capacitor 90 drops slightly below the +11.2 volt base clamping level. Transistor 85 begins to conduct when the voltage on capacitor 90 drops 1 $V_{BE}$ (the base-emitter junction offset voltage of transistor 85) below the voltage $V_R'$ at the emitter of transistor 85.

It is noted that the desired rapid rate of charging capacitor 90 to a desired level via switch 95 during channel change blanking intervals increases in accordance with the level of the charging voltage source coupled to the switch (+27 volts in this case). Thus the desired capacitor charging level can be reached sooner by increasing the magnitude of this voltage source. However, if capacitor 90 is permitted to charge to too high a voltage (e.g., approximately +27 volts in this case), the time required for the capacitor to discharge to a level low enough to permit transistor 85 to conduct after the channel change blanking interval ends may be excessively long. The clamping action of diode 98 assists to overcome this difficulty by limiting the voltage developed on capacitor 90 to a maximum of +11.2 volts as discussed.

The conduction of reference source transistor 85 increases gradually in accordance with the gradual, exponential discharging of capacitor 90 at the end of the channel change blanking interval, until the voltage on capacitor 90 reaches the stable quiescent level. This level is reached approximately 0.25 seconds after the channel changes blanking interval ends. At this time normal reference voltage $V_R$ again appears at the emitter of transistor 85. The described discharging action of capacitor 90 serves to gradually (exponentially) increase the conduction of video output transistors 71–75 after channel change blanking ends, so that these transistors are biased for normal operation when the voltage on capacitor 90 reaches the stable level.

By gradually increasing the conduction of the video output transistors in this manner after channel change blanking ends, the kinescope beam current is permitted to increase gradually, rather than abruptly. The magnitude of the kinescope beam current during this time is a function of the (decreasing) level of reference voltage $V_R$ and the level of the signals then appearing at the inputs of video output transistors 71, 73 and 75. When the level of these signals is associated with a signal condition capable of producing excessive beam currents, a point will be reached, some time after the end of the channel blanking interval, when the gradually decreasing reference voltage permits the beam current to reach the threshold level of the automatic beam current limiter operation. Automatic beam current limiting is initiated approximately 0.1 seconds after the threshold is reached, due to the initial beam limiter operating delay. From this time the rate of further increases of excessive beam current conduction above the threshold level is constrained by the initial (partial) limiting action of the automatic beam current limiter, until some later time when the beam limiter becomes fully effective for steady state beam current limiting (in this example approximately one-half second after the threshold current level is reached).

The exponential discharge rate of capacitor 90 in this example is slow enough to constrain potentially damaging levels of excessive beam current until the automatic beam current limiter can become effective, but is fast enough so that a viewer is unlikely to notice a delay between the time that the channel change interval ends and the time that an image is displayed by the kinescope. More specifically, the fifty millisecond discharge time constant for capacitor 90 is chosen so that the voltage on capacitor 90 substantially reaches the normal quiescent voltage value approximately 0.25 seconds after the channel change blanking interval ends. Accordingly, normal reference voltage $V_R$ and associated kinescope beam current conduction are also developed approximately 0.25 seconds after channel change blanking ends. This time interval is sufficient to permit the automatic beam current limiter, with an initial response time delay of 0.1 seconds in this example, to begin limiting excessive beam currents when present.

The channel change unblanking delay provided by network 65 as discussed prevents unsafe, potentially damaging levels of beam current from appearing for a period of time before the automatic beam current limiter becomes effective. Such high levels of beam current can be caused by video signal information associated with the channel to which the receiver is tuned and which appears immediately after the receiver is tuned to such channel. The high levels of beam current also can be caused by the often unpredictable behavior of the tuner and IF signal processing networks of the receiver during channel change. In this case abnormally high white level signals including noise can be produced until the AFT and AGC circuits associated with the tuner and IF networks resume normal, stabilized operation.

The unblanking delay provided by network 65 also assists to prevent the operation of the deflection circuits from being disrupted in the presence of abnormally high levels of beam current (i.e., several times greater than normally expected high beam current levels). With reference to FIG. 1, it is noted that abnormally high levels of beam current tend to "load" the horizontal flyback output of deflection circuits 38, with an attendant reduction in the level of the flyback signal which is employed for timing the operation of the switching network in deflection regulator 42. This can lead to irregular operation of the regulator, causing large variations in the regulator output voltage. Such operation often causes a condition sometimes referred to as "squegging" wherein the image display is badly distorted and includes random streaks across the display, among other effects.

The arrangement including auxiliary blanking control 65 and reference source 80 provides several significant advantages in addition to those mentioned previously.

Since network 65 operates with respect to reference source 80 which supplies a signal reference bias in common to each of the R, G, B video driver stages, the unblanking delay provided by network 65 serves to control the R, G, B kinescope drive signals comprising luminance and color difference signals, both of which can contribute to the production of excessively high beam current levels.

The blanking and unblanking control provided by network 65 is accomplished by means of DC rather than by AC signal control such that network 65 is essentially isolated from the video signal processing path. In addition, network 65 operates independent of the automatic brightness control loop. Therefore the use of a capacitance such as capacitor 90 for providing the blanking and unblanking delay control functions does not compromise the stability of the automatic brightness control loop. Also, the value of capacitor 90 can be tailored to suit the channel change blanking and unblanking timing requirements of a particular system without requiring a compensating adjustment of the signal processing parameters of the video signal processing circuits.

The described arrangement is especially useful in a television receiver with limited access to luminance and chrominance signal control points, such as in a receiver where luminance and chrominance signal processing occur primarily in an integrated circuit with a limited number of external terminals available for control purposes.

What is claimed is:

1. In a color television receiver including a video signal processing channel for providing plural color image representative video signals; a kinescope for providing a picture display in response to said color signals; plural video output stages for respectively supplying said plural color signals to said kinescope; means for automatically limiting excessive beam currents conducted by said kinescope; input frequency selective tuning means including an adjustable channel selector operated during channel changing intervals for selectably tuning said receiver; switch means coupled to a source of potential, and exhibiting a first switching state during said channel changing intervals and a second switching state at other times; and apparatus comprising:

a source of reference bias potential coupled in common to said plural video output stages and to which video signals processed by said video output stages are normally referenced; and blanking means coupled to said reference bias source and to said switch means, said blanking means exhibiting (1) a blanking response time for producing a modified reference bias potential during said channel changing intervals so that said video output stages and thereby said kinescope are blanked during said channel changing intervals, and (2) an unblanking response time slower than said blanking response time, for permitting said modified reference bias voltage to gradually return to normal after said channel changing interval ends.

2. Apparatus according to claim 1 and further comprising:

means for controlling the brightness of an image displayed by said kinescope, said brightness control means being arranged in a closed control loop with said video channel; and wherein said blanking means operates independently of said control loop including said brightness control means.

3. Apparatus according to claim 1, wherein:

said source of reference bias potential comprises an active device with an output terminal coupled to said plural video output stages; and means for biasing said active device to normally develop said reference potential at said output terminal;

said blanking means comprises charge storage means for providing a bias control voltage to said active device during said channel changing interval; and wherein said apparatus further includes means for clamping said bias control voltage to prevent excursions of said bias control voltage above a given level during said channel changing interval.

4. Apparatus according to claim 1, wherein:

said source of reference bias potential comprises a transistor with an input electrode and output and common electrodes defining a main current conduction path of said transistor including an output terminal; and means for biasing said transistor to normally develop said reference potential at said output terminal;

said blanking means comprises a capacitor coupled to a D.C. potential via a first impedance network including said switch means, for providing a bias control voltage to said transistor during said channel changing interval;

said bias control voltage is coupled to said transistor via a second impedance network including said transistor biasing means; and wherein said apparatus further includes a clamping network for limiting excursions of said bias control voltage above a given level during said channel changing interval.

5. Apparatus according to claim 4, wherein:

said switch means is coupled to said capacitor for modifying said bias control voltage and thereby said output reference potential at a first rate in accordance with the impedance of said first impedance network, during said channel changing interval; and for modifying said bias control voltage and thereby said output reference potential at a second rate slower than said first rate in accordance with the impedance of said second impedance network, after said channel changing interval ends.

6. Apparatus according to claim 5, wherein said transistor includes a base input electrode coupled to said biasing means, and collector and emitter electrodes defining said main current conduction path;

said bias control voltage is coupled to said transistor base input electrode; and said clampling network is coupled to said base input electrode and to a source of clamping reference potential.

* * * * *